United States Patent [19]

Bahr et al.

[11] Patent Number: 4,853,474

[45] Date of Patent: Aug. 1, 1989

[54] CROSS-LINKED ORGANOPOLYSILOXANES AND EMULSIONS BASED THEREON

[75] Inventors: Bradley C. Bahr; Peter Y. Lo, both of Midland; A. Wade Lomas, Rhodes; David J. Romenesko, Midland, all of Mich.

[73] Assignee: Dow Corning Corporation, Midland, Mich.

[21] Appl. No.: 70,896

[22] Filed: Jul. 8, 1987

[51] Int. Cl.$^4$ ................................................ C07F 7/08
[52] U.S. Cl. .................................. 556/445; 556/434; 556/437; 200/410.6; 252/351
[58] Field of Search ...................... 556/445, 434, 437; 260/410.6

[56] References Cited

U.S. PATENT DOCUMENTS

| | | | |
|---|---|---|---|
| 2,846,458 | 8/1958 | Haluska | 260/448.2 |
| 3,629,308 | 12/1971 | Bailey et al. | 556/445 |
| 3,846,462 | 11/1974 | Prokai et al. | 556/445 X |
| 3,867,420 | 2/1975 | Morehouse et al. | 556/445 X |
| 3,933,695 | 1/1976 | Omietanski et al. | 260/2.54 H |
| 4,059,606 | 11/1977 | Walsingham et al. | 556/445 X |
| 4,122,029 | 10/1978 | Gee et al. | 252/309 |
| 4,163,830 | 8/1979 | Windemuth et al. | 556/445 X |
| 4,520,160 | 5/1985 | Brown | 524/765 |
| 4,532,132 | 7/1985 | Keil | 514/772 |
| 4,687,786 | 8/1987 | Kollmeier et al. | 556/445 X |

OTHER PUBLICATIONS

"Optimization of External Oil Phase Systems by Differential Thermal Analysis" by C. Millet, Q. L. Nguyen, C. Zafran and C. Koulbanis; Thermochimica Act, 67 (1983) 157–165.

Primary Examiner—Paul F. Shaver
Attorney, Agent, or Firm—Price, Heneveld, Cooper, DeWitt & Litton

[57] ABSTRACT

The specification discloses an organopolysiloxane-polyoxyalkylene emulsifier for polar in nonpolar liquid emulsions wherein organopolysiloxane-polyoxyalkylene polymer molecules are intentionally cross linked through a cross linking agent joined thereto by nonhydrolyzable bonds and being free of internal hydrolyzable bonds.

10 Claims, 2 Drawing Sheets

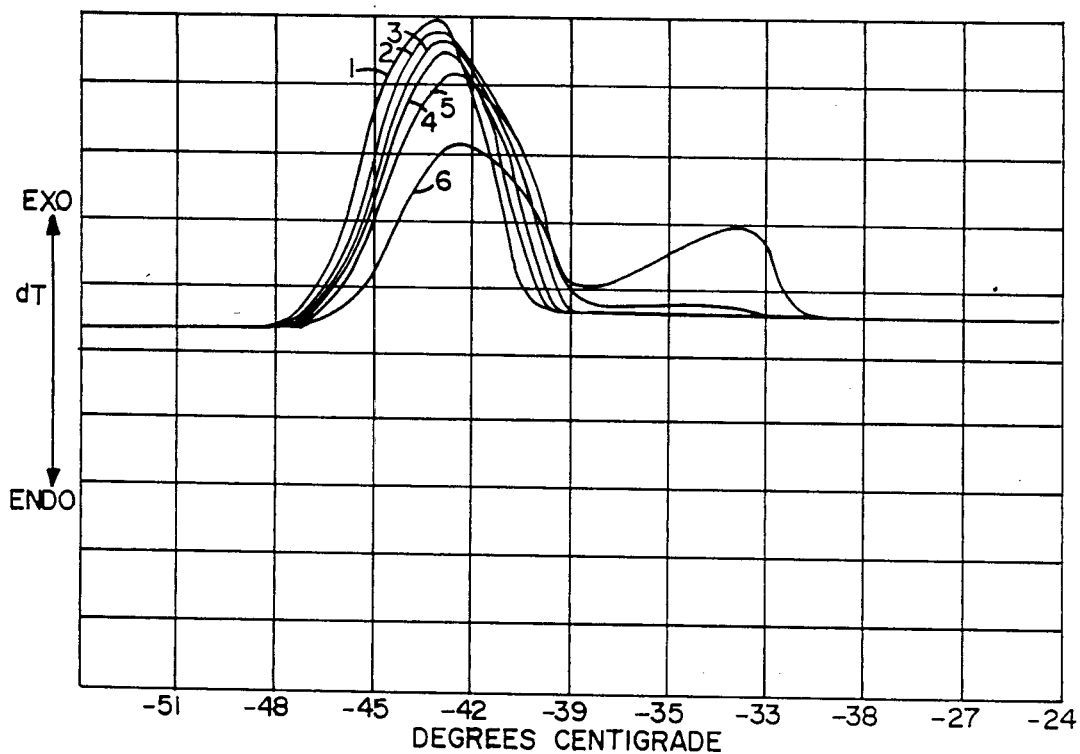

CROSS-LINKED ORGANOPOLYSILOXANES AND EMULSIONS BASED THEREON

BACKGROUND OF THE INVENTION

The present invention relates to organopolysiloxane-polyoxyalkylene emulsifiers for polar in nonpolar liquid emulsions, e.g., water in oil. While such emulsifiers have a wide variety of applications, it has been found that they do not reliably stabilize emulsions which are used in high temperature applications or which are subject to extreme temperature variations in use or storage.

For example, it has been suggested that or-organopolysiloxane-polyoxyalkylene emulsifiers be used to stabilize heavy brine in oil emulsions used in various oil field applications. However, such emulsions are subject to temperatures of 250 to 550 degrees F. and to substantial pressures, e.g., 30,000 psi and higher. It has been found that existing organopolysiloxane-polyoxyalkylene emulsifiers do stabilize such emulsions sometimes, but not reliably on a repeat basis.

Similarly, some emulsion products must withstand freeze thaw stability variations of from as much as −20 degrees C. to as much as 60 degrees C. One test specified by some manufacturers requires that such emulsions remain stable after cycling from −12 degrees C. to room temperature every day for 28 days. As above, organopolysiloxane-polyoxyalkylene emulsifiers are sometimes operable in such environments, but not reliably so.

Too often, emulsions stabilized by organopolysiloxane-polyoxyalkylene emulsifiers break down when subjected to conditions such as those described above. It is believed that no suitable explanation for the spotty performance of such emulsifiers has heretofore been offered. Nor has any solution to the problem been effected.

SUMMARY OF THE INVENTION

In the present invention, we have discovered that the key to obtaining organopolysiloxane-polyoxyalkylene emulsifiers which will reliably stabilize polar in nonpolar emulsions under the conditions described above is to provide for a degree of cross linking between organopolysiloxane-polyoxyalkylene molecules with cross linking radicals having nonhydrolyzable bonds both internally and to the organopolysiloxane=p-[olyoxyalkylene molecules. The production of the organopolysiloxane-polyoxyalkylene must be effected in such a way as to insure that cross linking occurs. The cross linking bridge is nonhydrolyzable so as to resist disintegration in the presence of water under the extreme conditions described above.

These and other objects, advantages and features of the invention will be more fully understood and appreciated by reference to the appended drawings and written specification.

BRIEF DESCRIPTION OF THE DRAWINGS

FIG. 3 discloses the differential thermal analysis graphs for an emulsion stabilized by an emulsifier made in accordance with the present invention which has been cycled through six freeze thaw cycles.

DESCRIPTION OF THE PREFERRED EMBODIMENT

Figure 1:
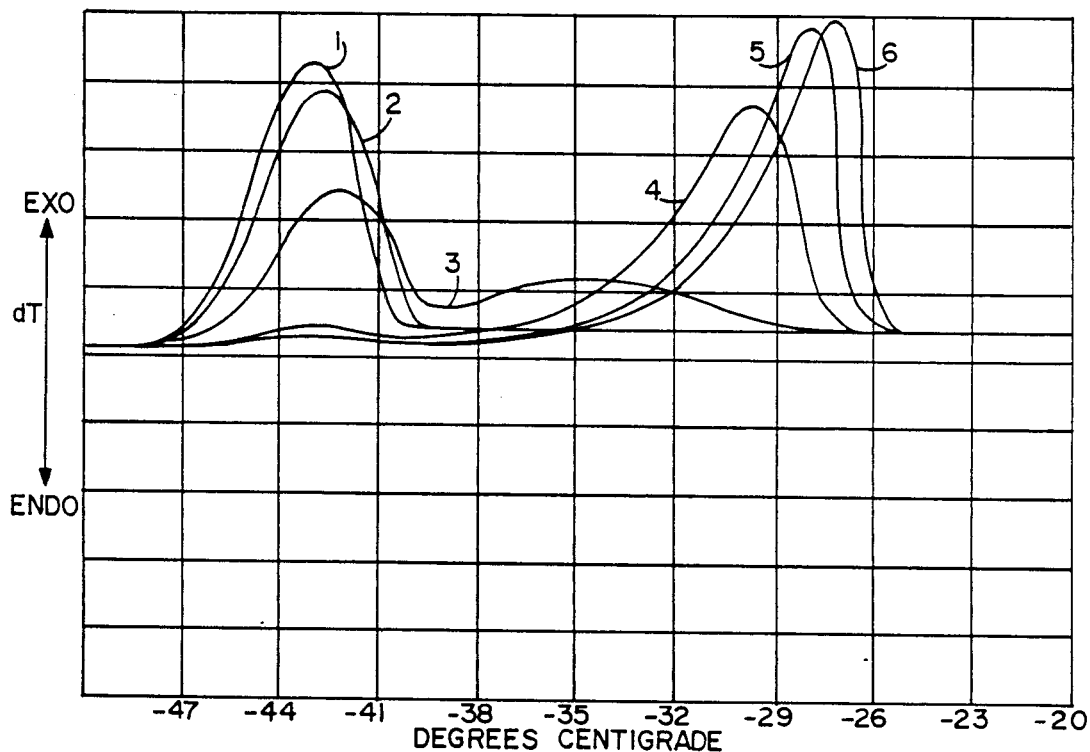
FIG. 1 shows the differential thermal analysis graphs for an emulsion stabilized using a prior art emulsifier which has been cycled through six freeze thaw cycles.

The preferred embodiment cross linked organopolysiloxane-polyoxyalkylene is of the following general formula:

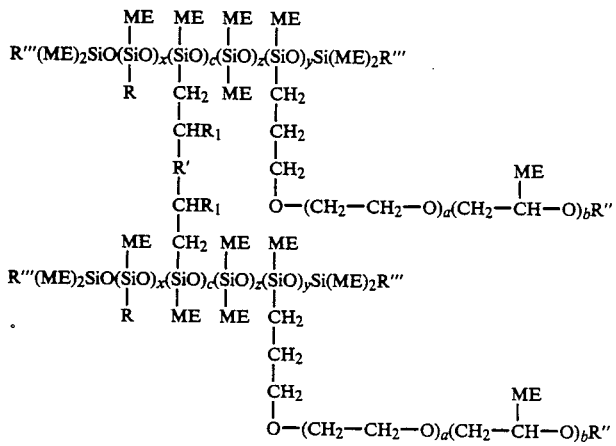

where

ME=CH$_3$—;

R=2 to 25 carbon aliphatic radical;

R′ = organic or organosiloxane group which contains no hydrolyzable bonds, is not adversely reactive with the ingredients the emulsifier is to stabilize and does not interfere with the organopolysiloxane-polyoxyalkylene formation;

R″ = a thermal group which is not adversely reactive with the ingredients the emulsifier is to stabilize and does not interfere with the organopolysiloxane-polyoxyalkylene formation;

R‴ =1 to 25 carbon aliphatic radical, which can be different for each different location;

R$_1$ is independently selected from the group consisting of the hydrogen atom and 1-3 carbon aliphatic radicals, which can be different for each different location;

$x = 0–100$;
$c = 105$;
$z = 0–600$;
$y = 1–10$;
$x + y + z \geq 40$;
$a = 4–40$;
$b = 0–40$;
$a/b \geq 1$.

The aliphatic radicals represented by R may include any of the $C_2$ to $C_{25}$ open-chain parafin olefin, and acetylenic hydrocarbons with parafinic hydrocarbons being preferred such as, for example, ethyl, propyl, hexyl, decyl, dodecyl, octadecyl, and eicosyl.

The organic groups represented by R' may include for example $C_1$ to $C_{10}$ alkylene radicals such as methylene, dimethylene, trimethylene, pentamethylene and decamethylene; cycloalkylene radicals such as cyclohexylene; divalent aromatic radicals such as p-phenylene or o-phenylene; and oxygen containing radicals such as —COO $CH_2CH_2OOC$— and —$CH_2OCH_2$—.

The terminal group represented by R" may include acyl radicals of $C_1$ to $C_{20}$, for example, acetyl, propionyl, butyryl, isobutyryl, lauroyl, myristoyl, and stearoyl, 3-carboxypentadecanoyl; alkyl radicals of $C_1$ to $C_{10}$ such as methyl, ethyl, propyl, butyl, and decyl; and the hydrogen atom. Other terminating groups possessing substantially the same properties as the above illustrative examples and which are prepared in a similar manner and which function in an equivalent manner may also be used.

The aliphatic radical represented by R''' may include any of the radicals illustrated above for R, but also includes the methyl radical.

The unit of the cross linking radical represented by $R_1$ may include the hydrogen atom and monovalent $C_1$ to $C_3$ aliphatic radicals such as methyl, ethyl and propyl.

It is preferred that the cross linking bond is not hydrolyzable, and that R' contains no hydrolyzable bonds. It is recognized that similar emulsifiers wherein the polyoxyalkylene units are attached to the organopolysiloxane units via SiOC bonds are useful in applications not requiring extended stability under conditions where hydrolysis may occur. It is further recognized that such emulsifiers containing cross links formed by SiOC bonds offer benefits of improved emulsion stability and consistency in such applications not requiring extended stability under conditions where hydrolysis may occur. In conventional organo siloxane-polyoxyalkylenes, some cross linking may accidentally occur where the polyoxyalkylene is hydroxy terminated at one end. The hydroxy group may react with a silicon hydride creating a polyoxyalkylene bridge between two silicon backbone molecules as shown below:

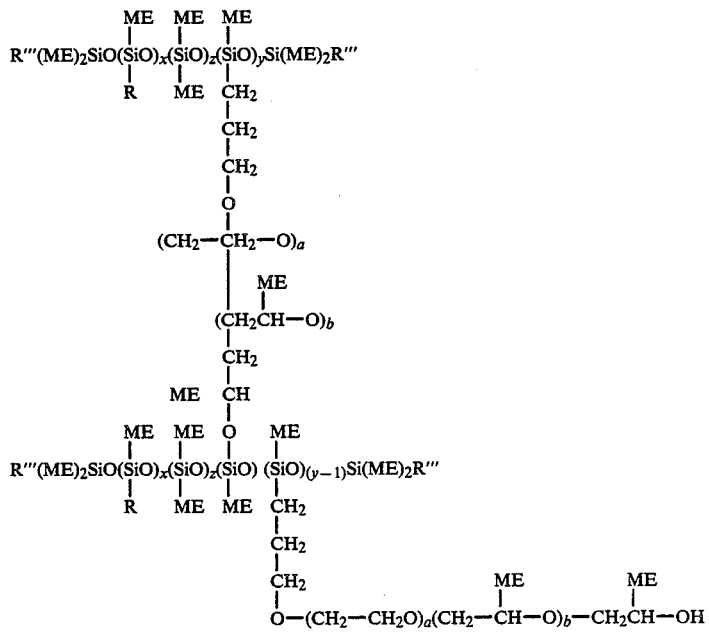

However, the degree to which this cross linking may occur in the reaction process is not reliably predictable. Further, the SiOC bond formed at the hydroxy end of the bridge is subject to hydrolysis, especially under the extreme operating conditions described above.

In contrast, the preferred bridge bond of the organopolysiloxane-polyoxyalkylene of the present invention is a saturated carbon-silicon bond which is not hydrolyzable and is highly stable. Further, the organic or organo siloxane body R' of the cross linking bridge is selected to be free of hydrolyzable bonds. It is also important that it be free of reactive sites which would react with ingredients incorporated into the emulsion to be emulsified. Further, R' should not interfere with the organopolysiloxane-polyoxyalkylene formation in any way.

A preferred cross linking radical is a vinyl terminated organosiloxane. An organosiloxane bridge cooperates with the siloxane backbones which it bridges to create a siloxane network at the interface of water and oil in the emulsion. This network is through to be important in effecting the stabilizing properties and characteristic of the present invention. The most preferred organo siloxane cross linking material is tetramethyldivinyldisiloxane of the following formula:

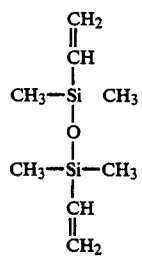

The organopolysiloxane-polyoxyalkylene molecules which are cross linked must themselves be soluble in nonpolar liquid. If the organopolysiloxane-polyoxyalkylene is readily dispersible in a nonpolar oil in a manner comparable to solubility, it is also considered "soluble" as that term is used herein. In order to effect such nonpolar oil solubility, the characteristics of the siloxane backbone may be muted either by the presence of aliphatic radicals appended to the siloxane backbone, or by the presence of a significant number of dimethyl siloxane groups in the siloxane chain, or both. The appended polyoxyalkylene groups also enhance nonpolar oil solubility, though a quantity of either the dimethyl siloxane groups, the aliphatic groups or both are required in excess of the number of polyoxyalkylene groups included in the molecule. Hence, the number of siloxane groups to which an aliphatic radical is appended is from 0 to 100. The number of dimethyl siloxane groups is from 0 to 600. The number of polyoxyalkylene appended siloxane group is from 1 to 10. The combined total of those three different types of organo substituted siloxane groups is at least 40, thereby requiring at least some dimethyl siloxane groups or aliphatic siloxane groups, or both in addition to the polyoxyalkylene siloxane groups.

The general formula of the preferred embodiment cross linked organopolysiloxane-polyoxyalkylene illustrates two organopolysiloxane-polyoxyalkylene molecules bridged by a single linking radical. However, where C is greater than 1, there may be more than one cross linking bridge between adjacent organopolysiloxane-polyoxyalkylene molecules, and/or there may be more than two organopolysiloxane-polyoxyalkylene molecules linked together in the manner set forth below:

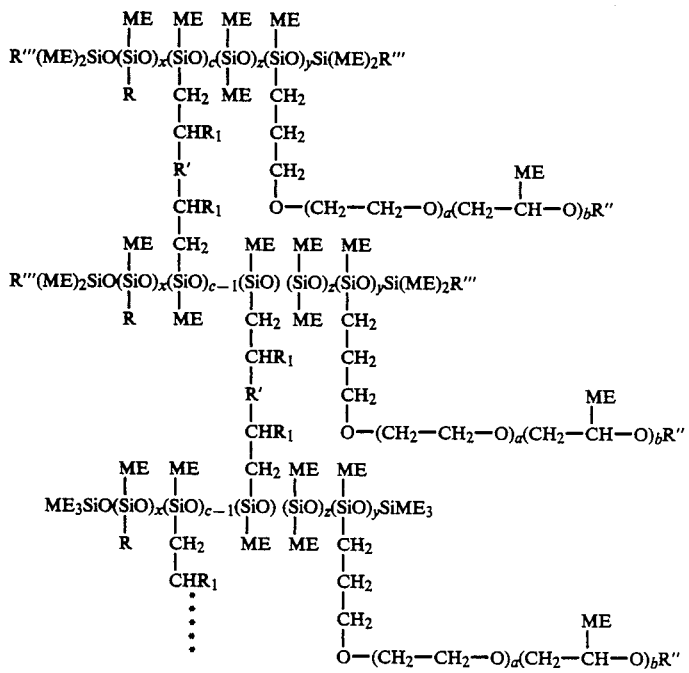

The exact number of organopolysiloxane-polyoxyalkylene polymer molecules which will be bridged together will probably be not more than about 6. One limitation on such cross linking is that the overall molecular weight must not become so great as to cause the material to gel. The extent of cross linking must thus also be regulated relative to the molecular weight of each individual organopolysiloxane-polyoxyalkylene polymer molecule being cross linked since the overall molecular weight must also be maintained sufficiently low to avoid gelling. A higher molecular weight in each individual polymer unit would require that there be less multiple cross linking between units.

In the broadest aspects of the invention, it can be said that there are from 1 to 5 cross linking bridges between 2 polymers, or where C is greater than 1, cross linking bridges between 3 to 6 polymer units.

The production of silicone emulsifiers in accordance with the present invention involves the α-olefin addition of the desired aliphatic groups (R), the cross linking material and the polyoxyalkylene group to a siloxane polymer backbone having the following general formula:

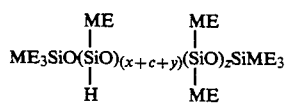

where
$x = 0-100$;
$c = 1-5$;
$y = 1-10$; and z=0-600.

The radical precursors must be vinyl terminated. For example, where a 12 carbon aliphatic radical R is desired, 1-dodecene is used as the radical precurser in the reaction. The vinyl terminated cross linking compound has been discussed above. The polyoxyalkylene is similarly vinyl terminated at one end.

A portion of the aliphatic radical prescursor is first added to the siloxane polymer backbone material along with a suitable hydrosilation catalyst under a nitrogen atmosphere. Only a portion of the aliphatic radical precursor is reacted first in order to be certain that sufficient silicon hydride reaction sites remain for the addition of the cross linking agent and the polyoxyalkylene.

The divinyl cross linking agent is reacted next, again in the presence of an appropriate hydrosilation catalyst and heat. Then the vinyl polyoxyalkylene is added to the reaction vessel and reacted using an appropriate catalyst and heat. Finally, the remainder of the aliphatic radical precursor is added to the reaction vessel and reacted with the remaining siloxane hydride reaction sites.

The emulsion compositions of the present invention are of the polar in nonpolar liquid type, e.g., water in oil, wherein the dispersed phase is a polar liquid and the continuous phase is a nonpolar liquid. By polar, we mean a substance which has a permanent dipole moment. By nonpolar, we mean a substance that has a sufficiently low degree of polarity that the polar liquid is not soluble in the substance. Nonpolar substances include substances having no permanent dipole moment in the molecule, and also substances which may have a site within the molecule having a permanent dipole moment but where the major portion (greater than 50%) of the molecule does not contribute to the permanent dipole moment so that the general characteristics of the substance are more representative of the nonpolar portion of the molecule. The polar liquid may be any suitable liquid composition which is insoluble at room temperature in the base nonpolar oil. The polar liquid may be a pure liquid or a liquid solution of a mixture of liquids, the components of which are polar and insoluble in the base liquid. Solid polar materials may be used if they are changed to a liquid form, such as by heating to melt the solid or by dissolving the solid in a solvent so as to render the resulting solution polar.

Exemplary of suitable materials which are polar include inorganic materials such as water, salts, weak acids, weak bases and aqueous solutions thereof and organic materials bearing polar groups such as organic compounds or polymers bearing nitrogen-containing groups such as in amides, amines, amine salts, nitriles, imides, imines, lactams, and nitro compounds; oxygen-containing groups such as in ethers, alcohols such as glycerol, sorbitol, and mannitol, and in carbonyl groups such as in ketones, aldehydes, carboxylic acids and their salts, esters and lactones; phosphorous-containing groups such as in phosphates and phosphonium salts; sulfur-containing groups such as in sulfones, mercaptans, sulfoxides and sulfides; and halogens such as in hydrocarbon chlorides, bromides, and iodides. The presence of said polar groups in the organic material provides a permanent dipole moment and thus provides the polar character in the organic material.

Examples of nonpolar continuous phase liquids suitable for use in the present invention include parafinic hydrocarbons, crude and refined petroleum oils, hydrocarbon oils and waxes such as petrolatum, perhydrosqualene and paraffin wax; silicone oils such as cyclic and/or linear polydimethylsiloxanes, polyphenylmethylsiloxanes, methylsiloxane resins and mixtures thereof; esters, such as lanolin, spermaceti, triglyceride esters, fatty esters of glycols, alkyl esters of fatty acids such as methyl esters of fatty acids; non-volatile alcohols, such as cholesterol, lanolin alcohol, lauryl alcohol, cetyl alcohol, oleyl alcohol and stearyl alcohol; phospholipids; fatty alcohol ethers, such as stearyl ether of polyoxyethylene; and hydrophilic derivatives of said other emollients.

The emulsions compositions of this invention can comprise from about 1 to about 75, preferably from about 50 to about 75 parts by weight of the dispersed phase, from about 5 to about 50 and preferably from about 10 to about 30 parts by volume of the continuous phase and from about 0.2 to about 10, preferably from about 1 to about 3 parts by volume of an organo polysiloxane emulsifier in accordance with the present invention, the total of dispersed phase, continuous phase and organo polysiloxane emulsifier being 100 parts by volume.

The emulsion compositions can be prepared by any suitable manner. They are typically prepared by admixing the polar and nonpolar liquid phases in the presence of the organo polysiloxane emulsifier of the present invention. Sufficient agitation and/or shear is used to disperse the polar phase as droplets having a size of preferably less than about 10 micrometers, and most preferably less than about 1 micrometer. Mild heating of the components may be used to aid in the admixing.

EXAMPLE 1

In accordance with the above general procedure, a cross linked organopolysiloxane-polyoxyalkylene in accordance with the present invention was prepared based on the following formulation:

| | |
|---|---|
| 15.7% | $ME_3SiO(MEHSiO)_{41(30-60)}SiME_3$ |
| 36.2% | 1st dodecene addition |
| 15.0% | 2nd dodecene addition |
| 9.0% | Isotearyl alcohol |
| 23.6% | $CH_2=CHCH_2(OCH_2CH_2)_{19}(OCH_2\overset{\underset{\displaystyle CH_3}{\mid}}{CH})_{19}-OH$ |
| 0.5% | $CH_2=CH\underset{\underset{\displaystyle CH_3}{\mid}}{\overset{\overset{\displaystyle CH_3}{\mid}}{Si}}\quad O\quad \underset{\underset{\displaystyle CH_3}{\mid}}{\overset{\overset{\displaystyle CH_3}{\mid}}{Si}}CH=CH_2$ |
| 14 ppm | Pt. (chloroplatinic acid (2% $H_2PtCl_6.6H_2O$)/IPA) hydrosilation catalyst |

As will be appreciated by those skilled in the art, the siloxane backbone material actually includes a mixture in which the methyl siloxane hydride units may comprise anywhere from approximately 30 to approximately 60 units on a given siloxane molecule. However, the mean is approximately 41 as indicated.

The dodecene is at 91% olefinic activity. The indicated percentages are by weight. The indicated pH of the vinyl polyoxyalkylene glycol was determined based on a 15% by weight solution thereof in water.

All of the siloxane backbone material and 10% of the first dodecene addition is loaded into the reactor with agitation and the pressure is reduced by about 25 millimeters of mercury for one minute, after which the vessel is backfilled with nitrogen. With a nitrogen sweep, the mixture is heated to 85 degrees C. and 25% of the catalyst solution and the remainder of the first dodecene addition are added over a period of two to three hours holding the temperature at 105 to 115 degrees. After all of the first dodecene addition is completed, the vessel is held at 110 degrees C. for 15 minutes.

The temperature is then dropped to 80 degrees C. and all of the divinyl tetramethylsiloxane cross linking agent is added along with an additional 25% of the catalyst solution. The vessel reaction temperature is returned to 110 degrees and held there for 15 minutes.

At this point, the isostearyl alcohol is added along with the vinyl polyoxyalkylene. The vessel is again degassed and backfilled as in the first step described above. The use of isostearyl alcohol is pursuant to the teachings of U.S. Pat. No. 4,520,160 to Paul L. Brown entitled ORGANOPOLYSILOXANE EMULSIFIER COMPOSITIONS AND METHOD THEREFOR, issued on May 28, 1985, assigned to Dow Corning Corporation of Midland, Michigan.

Another 30% of the catalyst solution is added and the temperature increased to 110 degrees C. and held there for 30 minutes. The material should then be clear. If not, additional catalyst is added and the vessel is held at 110 degrees C. for another 30 minutes. If the solution is not clear, the polyoxyalkylene has not added.

The remainder of the catalyst is then added to the vessel and it is heated to 120 degrees C. and held there for 30 minutes. The second dodecene addition is then made and the vessel held at 120 degrees C. for an additional hour. Thereafter, the composition is cooled and removed from the reaction vessel.

The resulting emulsifier which is in accordance with the present invention has the following general formula:

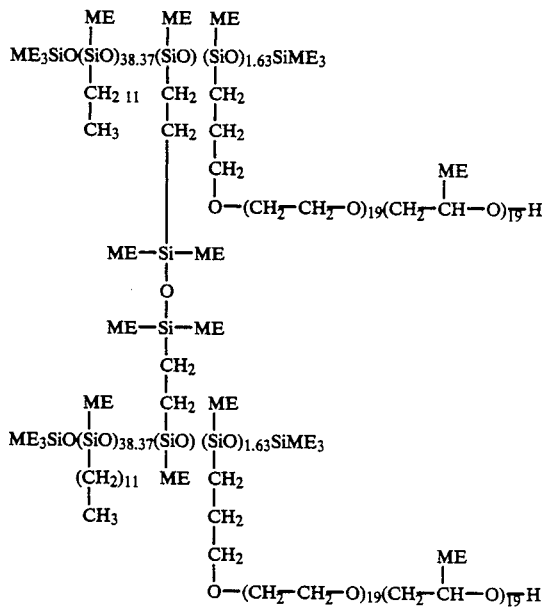

Thus, the emulsifier of this example included no dimethyl siloxane groups, but an average of 38.37 aliphatic added siloxane groups. The numerical values indicated were calculated based on starting ingredients. The divinyl disiloxane is added at only about 0.5% by weight, creating one cross link per polymer.

COMPARATIVE TESTING OF EXAMPLE 1 EMULSIFIER

A number of lots of emulsifier made in accordance with Example 1 and a number of lots of similar prior art material, obviously not including the cross linking bridges of the present invention, were used to prepare hand cream emulsions which were subjected to freeze thaw tests and observed for degree of oil separation and degree of water separation. These emulsions comprised 65% by weight water phase and 35% by weight oil phase, wherein the emulsifier comprised 2% by weight of the total and is contained in the oil phase. The emulsions were maintained alternatively at 60 degrees C. for 12 hours and then −12 degrees C. for 12 hours over a six day period, after which the degree of oil and water separation was observed. A rating of 1 on the bar chart of Table I below indicates no separation while a rating of 5 indicates extensive separation. The results are presented in Table I below:

TABLE I

| | Temperature Swing Test Over 6 days 12 h: +60°/12 h: −12° C. | | | | | | | | | |
|---|---|---|---|---|---|---|---|---|---|---|
| | Oil Separation | | | | | Water Separation | | | | |
| Lot No. | 1 | 2 | 3 | 4 | 5 | 1 | 2 | 3 | 4 | 5 |
| 1 | # # # # | | | | | # # # # | | | | |
| 2 | # # # # # # # # # # # # # # # # # # # # | | | | | # # # # # # # # # # # # # # # # # # # # | | | | |
| 3 | # # # # # # # # # # # # # # # # # # # | | | | | # # # # # # # # # # # # # # # # # # # # | | | | |
| 4 | # # # # # # # # | | | | | # # # # | | | | |
| 5 | # # # # # # # # # # # # # # # # # # # # | | | | | # # # # # # # # # # # # # # # # # # # # | | | | |
| 6 | # # # # # # # # # # # # # # # | | | | | # # # # # # # # # # # # # # | | | | |
| 7 | # # # # # # # # # # # # # # # # # # # # | | | | | # # # # # # # # # # # # # # # # # # # # | | | | |
| 8 | # # # # # # # # # # # | | | | | # # # # | | | | |
| 9 | # # # # # # # # # # # # # # # # # # # # | | | | | # # # # # # # # # # # # # # # # # # # # | | | | |
| 10 | # # # # # # # # # # # # # # # # # # # # | | | | | # # # # # # # # # # # # # # # # # # # # | | | | |
| 11 | # # # # | | | | | # # # # | | | | |
| 12 | # # # # # # # # | | | | | # # # # | | | | |
| 13 | # # # # # # # # | | | | | # # # # | | | | |
| 14 | # # # # | | | | | # # # # | | | | |

TABLE I-continued

| | Temperature Swing Test Over 6 days 12 h: +60°/12 h: −12° C. | | | | | | | | | |
|---|---|---|---|---|---|---|---|---|---|---|
| | Oil Separation | | | | | Water Separation | | | | |
| Lot No. | 1 | 2 | 3 | 4 | 5 | 1 | 2 | 3 | 4 | 5 |
| 15 | # # # # | | | | | # # # # | | | | |
| 16 | # # # # | | | | | # # # # | | | | |
| 17 | # # # # | | | | | # # # # | | | | |
| 18 | # # # # # # # # # # # # # | | | | | # # # # | | | | |
| 19 | # # # # | | | | | # # # # | | | | |
| 20 | # # # # # # # # # # # | | | | | # # # # # # # # # # # # # # # | | | | |
| 21 | # # # # # # # # # # # | | | | | # # # # # # # # | | | | |
| 22 | # # # # | | | | | # # # # | | | | |
| 23 | # # # # | | | | | # # # # | | | | |
| 24 | # # # # | | | | | # # # # | | | | |
| 25 | # # # # | | | | | # # # # | | | | |
| 26 | # # # # | | | | | # # # # | | | | |
| 27 | # # # # | | | | | # # # # | | | | |

Lot numbers 1–21 were all prepared in accordance with the same prior art formulation. Lots 1 and 11–21 were laboratory prepared samples made in accordance with a prior art formulation. Lots 2–10 were attempted scale-ups of the laboratory preparations. Lots 22–27 were laboratory samples prepared in accordance with Example 1.

As can be seen by reference to lot samples 1, 11, 14–17 and 19, organopolysiloxane-polyoxyalkylene emulsifiers made in accordance with the prior art did stabilize the emulsions satisfactorily. However, other lots made in accordance with the same procedure and formulation, i.e., lots 2, 3, 5–10, 12, 13, 18, 20 and 21, simply did not perform satisfactorily under the freeze thaw test conditions.

In contrast, all of the samples made in accordance with Example 1, lots 22–27 performed satisfactorily on a reliable repeat basis. No water or oil separation was experienced.

Similarly, differential thermal analyses were conducted on several of the foregoing formulations generally in accordance with the procedure outlined in an article by C. Millet et al. entitled "Optimization of External Oil Phase Systems by Differential Thermal Analysis" published in Thermochimica Acta, 67 (1983) 157–165. In each series of tests, a given sample was cycled from −60 degrees C. to +30 degrees C. six times, with a differential thermal analysis curve plotted for each cycle. To the extent that the curves obtained are closely similar for all six tests, exceptional emulsion stability is indicated. To the extent that there are significant variations, a high degree of emulsion instability is indicated.

FIG. 1 shows such a series of DTA graphs for an emulsion made from a prior art emulsifier, specifically the emulsion of lot 20 above. The degradation of the emulsion over the six cycles is clearly illustrated.

Figure 2:
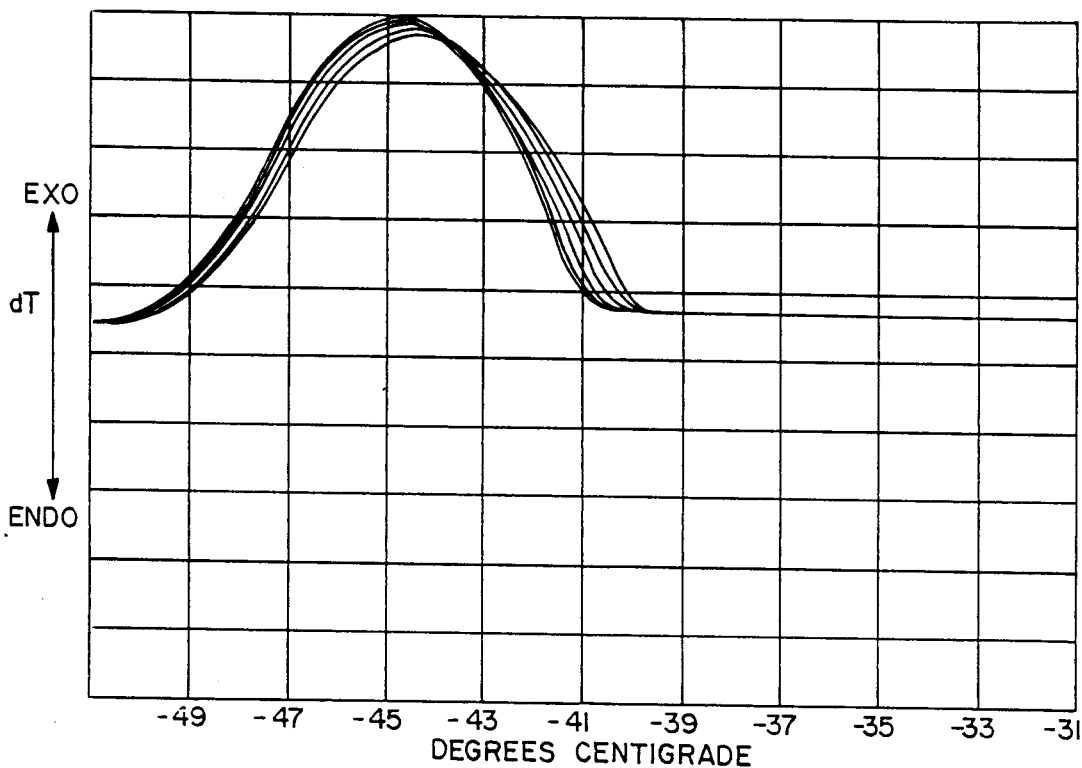
FIG. 2 shows the differential thermal analysis graphs for an emulsion stabilized using a prior art emulsifier which has been cycled through six freeze thaw cycles, wherein the prior art formulation is made in the same manner and in accordance with the same formulation as that used for FIG. 1.

On the other hand, the same cycle tests conducted on an emulsion sample from lot 17 above is shown in FIG. 2 and indicates a stable emulsion throughout. The difference confirms the unpredictability of emulsifiers made in accordance with the prior art.

FIG. 3 illustrates the same series of differential thermal analyses done on the same emulsion, but using an emulsifier made in accordance with the present invention. The consistency of the DTA graphs for cycles 1–6 illustrates the stability of an emulsion made using an emulsifier of the present invention.

EXAMPLES 2–4

Using the cross linked surfactant of the present invention made in accordance with Example 1, the following formulations were made and tested:

| OIL PHASE | EXAMPLE 2 | EXAMPLE 3 | EXAMPLE 4 |
|---|---|---|---|
| Cross linked organo siloxane-polyoxyalkylene | 2.00 | 2.00 | 2.00 |
| Kaydol TM mineral oil | 10.00 | 10.00 | 10.00 |
| Petrolatum | 2.00 | 2.00 | 2.00 |
| Lanolin | 1.00 | 1.00 | 1.00 |
| IPM isopropyl myristate | 2.00 | 2.00 | 2.00 |
| polydimethyl siloxane emollient (350 centistoke) | 1.00 | 1.00 | 1.00 |
| 15% cyclic pentamer & 85% cyclic tetramer dimethyl cyclic polysiloxanes | 5.00 | 5.00 | 5.00 |
| Water | 75.00 | 74.10 | 73.00 |
| NaCl | 2.00 | 2.00 | 2.00 |
| Glycerin | 5.00 | 5.00 | 5.00 |
| Organic surfactant | | | |
| A. Arlacel TM 165 | | 0.90 | |
| B. Arlacel TM 83 | | | 2.00 |
| C. Span TM 20 | | | |

The foregoing emulsions were prepared by heating the ingredients of the oil phase and water phase separately to about 60 degrees C. The water phase is then added to the oil phase with homogenization. Homogenization continues until the emulsion becomes uniform and a cream develops.

EVALUATION OF THE EXAMPLE 2–4 EMULSIONS

The emulsions of Examples 2–4 all resulted in soft creams. Viscosity of the Example 2 emulsion was around 20,000 centistokes tested using a Brookfield viscometer, spindle C at 10 rpm. The similarly determined viscosity of the Example 3 cream was approximately 52,000. The viscosity of the Example 4 cream was approximately 28,000. All three samples were put through a freeze thaw cycle test for four days, cycling them from freezing to thawing each day. None of the samples had separated at the end of that time.

EXAMPLES 5–7

In Examples 5–7, the same emulsifier used in Examples 2–4 was used to prepare water and oil emulsions. The table below indicates the variations in ingredients in the emulsions of Examples 5–7:

| OIL PHASE | EXAMPLE 5 | EXAMPLE 6 | EXAMPLE 7 |
|---|---|---|---|
| Cross linked organopolysiloxane-polyoxyalkylene | 2.00 | 2.00 | 2.00 |
| Organic surfactant | | | |
| A. Arlacel ™ 165 | 0.90 | | |
| B. Arlacel ™ 83 | | 2.00 | |
| C. Span ™ 60 | | | |
| D. Span ™ 20 | | | 1.20 |
| E. Glyceryl Monostearate | | | |
| Mineral oil | 9.00 | 9.00 | 9.00 |
| (IPM) Isopropyl myristate | 3.00 | 3.00 | 3.00 |
| Caprylic/capric triglyceride emollient | 4.00 | 4.00 | 4.00 |
| polydimethyl siloxane (200 centistoke) | 1.00 | 1.00 | 1.00 |
| WATER PHASE | | | |
| Water | 72.90 | 71.80 | 72.60 |
| KCl | 2.00 | 2.00 | 2.00 |
| Dowacil ™ 200 preservative | 0.20 | 0.20 | 0.20 |
| Glycerin | 5.00 | 5.00 | 5.00 |

As above, the oil phase and water phase ingredients were mixed separately and heated to 60 degrees C. They were then mixed together with homogenization until uniform.

EXAMPLES 5–7 RESULTS

The emulsions of Examples 5–7 were all soft creams. The approximate viscosities were 44,000 for the Example 5 material, 13,000 for the Example 6 material and 15,000 for the Example 7 material. All of the emulsions survived five days of freeze thaw cycling, once each day without separation.

EXAMPLE 8

In Example 8, two different emulsifiers were prepared simultaneously, one being intentionally cross linked in accordance with the present invention (flask B material) and the other being made in accordance with the prior art (flask C material). Emulsions were prepared from the two materials and were monitored for viscosity over time.

A polydimethylsiloxane-polyoxyethylenepolyoxypropylene copolymer was prepared from a trimethylsiloxane end blocked polydimethylsiloxane having a molecular weight of approximately 30,000 and having an average of approximately four of its dimethylsiloxane units replaced with methylhydrogensiloxane units, and a random equimolar polyglycol copolymer of ethylene oxide and propylene oxide having an average molecular weight of approximately 2550 and having allyloxy end groups on one end and hydroxy end groups on the other end. The reaction was performed by mixing 478.9 g of the siloxane, 130.2 g of the polyglycol, and 166.9 of isopropyl alcohol saturated with sodium acetate into a flask (A) equipped for reflux under a nitrogen blanket. The reaction mixture was catalyzed with 2.63 g of a 1.25% solution by weight of $H_2PtCl_6 \cdot 6H_2O$ in isopropyl alcohol. The flask contents were then brought to reflux (~85 degrees C.) for one-half hour. One hundred ninety-three grams of the described reaction mixture was separated and was analyzed to have approximately 38% of its original hydrogen content available for further reaction. A stoichiometric amount (0.63 g) of vinyl supplied in the form of tetramethyldivinyldisiloxane was added to the mixture in flask (B) and the flask was equipped as before. The mixture was brought to reflux for another one-half hour. Another 193 grams was separated from the original mixture and was allowed to reflux for another one-half hour in flask (C) without the addition of tetramethyldivinyldisiloxane. One hundred fifty-six grams of a mixture of cyclopolydimethylsiloxanes were added to each of flasks (B) and (C), and the isopropyl alcohol was then stripped from each flask at 140 degrees C. for one hour at ambient pressure using a nitrogen purge. In both of these organopolysiloxane-polyoxyalkylene copolymers, there is no aliphatic radical. X in the general formula above is 0.

Emulsions were prepared from the two materials by mixing approximately 19.2 parts of the emulsifier (polydimethylsiloxane-polyoxyethylene-polyoxypropylene copolymer dispersed in cyclopolydimethylsiloxanes) with 78.9 parts of the external phase (a mixture of cyclopolydimethylsiloxanes) and 1.9 parts of the internal phase (distilled, deionized water) on an Eppenback high shear mixer. The emulsions were monitored for viscosity over time. The emulsion prepared from flask (B) had an initial viscosity of 17,740 cp and drifted downward to 17,680 cp in 11 days (0.3%). The emulsion prepared from the flask (C) emulsifier was initially 825 cp in viscosity and drifted downward to 608 cp over 11 days (26%). Thus a more stable emulsion was produced from the emulsifier which was intentionally cross-linked in accordance with the present invention.

EXAMPLES 9 AND 10

The formulas of Examples 9 and 10 are examples of emulsions which would operate well with the "flask B" emulsifier of Example 8, wherein "x" as set forth in the general formula is "0".

| INGREDIENT | WT % |
|---|---|
| Oil Phase | |
| Emulsifier of flask B, Example 8 | 6.00 |
| Cyclomethicone | 4.00 |
| Octyl hydroxystearate | 6.00 |
| Mink oil | 5.00 |
| Stearic acid | 3.80 |
| Octyl dimethyl PABA | 3.00 |
| Myristyl myristate | 1.50 |
| Glyceryl stearate S.E. | 1.00 |
| Fragrance | q.s. |
| Water Phase | |
| Water | 65.05 |
| Propylene glycol | 3.50 |
| Carbopol 934 | 0.15 |
| Tetrahydroxypropyl ethylenediamine | 1.00 |
| Preservative | q.s. |
| | 100.00 |

EXAMPLE 9

EXAMPLE 10

| INGREDIENT | WT % |
|---|---|
| Phase A | |
| Emulsifier of flask B, | |

-continued

| INGREDIENT | WT % |
|---|---|
| Example 8 | 5.0 |
| Isocetyl stearate | 3.0 |
| Stearyl alcohol (and) ceteareth 20 | 2.5 |
| Myristyl myristate | 2.5 |
| Phase B | |
| Water | 86.5 |
| Carbomer 934 | 0.3 |
| Triethanolamine | 0.2 |
| Fragrance | q.s. |
| Preservative | q.s. |
| | 100.0 |

IN each of the above cases, the oil and water phase ingredients were mixed separately, both heated to 70 degrees C. and then the oil phase is added to the water phase with agitation.

EXAMPLE 11

In Example 11, an emulsion of a 2.8% sodium chloride solution in octamethylcyclotetrasiloxane was emulsified with the emulsifier used in Example 1. The formulation for the emulsion is as follows:

```
40%  octamethylcyclotetrasiloxane
 4%  emulsifier of Example 1
56%  2.8% sodium chloride in water solution,
     with all percentages being by weight.
```

To prepare the emulsion, the octamethylcyclotetrasiloxane and the emulsifier of Example 1 were loaded into a 600 ml beaker and mixed for one minute using an Eppenback homogenizer set at 45 volts. The 2.8% sodium chloride solution was then added over a five minute period, with the homogenizer operating at 55 volts. This was followed by mixing for one minute at 70 volts, 30 seconds at 50 volts and 30 seconds at 60 volts in that sequence.

The octamethylcyclotetrasiloxane constituted the external phase of the emulsion. After three days at room temperature, no free water and only very slight oil were apparent in the emulsion. After three days in an oven at 60 degrees C., the stability results were the same.

Of course, it is understood that the above describes the preferred embodiment of the invention and that various changes and alterations can be made without departing form the spirit and broader aspects thereof.

The embodiments of the invention in which an exclusive property or privilege is claimed are defined as follows:

1. An organopolysiloxane-polyoxyalkylene useful as an emulsifier comprising:
   at least two organopolysiloxane-polyoxyalkylene molecules cross linked by a cross linking radical having nonhydrolyzable bonds to the organopolysiloxane-polyoxyalkylene molecules and being free of internal hydrolyzable bonds which under conditions inducing hydrolysis could result in separation of the two organopolysiloxane-polyoxyalkylene molecules.

2. The composition of claim 1 having the following general formula:

$$R'''(ME)_2SiO(SiO)_x(SiO)_c(SiO)_z(SiO)_ySi(ME)_2R'''$$

with pendant groups: ME, R, CH$_2$, CHR$_1$, R', CHR$_1$; ME, CH$_2$, CH$_2$, CH$_2$, O—(CH$_2$—CH$_2$—O)$_a$(CH$_2$—CH—O)$_b$R''

$$R'''(ME)_2SiO(SiO)_x(SiO)_c(SiO)_z(SiO)_ySi(ME)_2R'''$$

with pendant groups: ME, R, CH$_2$, CH$_2$, CH$_2$; ME, ME, ME, O—(CH$_2$—CH$_2$—O)$_a$(CH$_2$—CH—O)$_b$R'' where
ME=CH$_3$—;
R=2 to 25 carbon aliphatic radical;
R'=organic or organosiloxane group which contains no hydrolyzable bonds, is not adversely reactive with the ingredients the emulsifier is to stabilize and does not interfere with the organopolysiloxane-polyoxyalkylene formation;
R''= a terminal group which is not adversely reactive with the ingredients the emulsifier is to stabilize and does not interfere with the organopolysiloxane-polyoxyalkylene formation;
R'''=1 to 25 carbon aliphatic radical, which can be different for each different location;
R$_1$ is independently selected from the group consisting of the hydrogen atom and 1-3 carbon aliphatic radicals, which can be different for each different location;
$x=0-100$;
$c=1-5$;
$z=0-600$;
$y=1-10$;
$x+y+z \geq 40$;
$a=4-40$;
$b=0-40$;
$a/b \geq 1$.

3. The composition of claim 2 wherein C is greater than 1 and there are up to six organopolysiloxane-polyoxyalkylene molecules cross linked together.

4. The composition of claim 3 in which said cross linking radical is linked to the siloxane backbone of said organopolysiloxane-polyoxyalkylene molecules through a saturated silicon to carbon bond.

5. The composition of claim 4 in which said cross linking radical is an organo siloxane radical.

6. The composition of claim 5 in which said cross linking radical comprises diethyltetramethyldisiloxane.

7. The composition of claim 2 in which said cross linking radical is linked to the siloxane backbone of said organopolysiloxane-polyoxyalkylene molecules through a saturated silicon to carbon bond.

8. The composition of claim 2 in which said cross linking radical is an organo siloxane radical.

9. The composition of claim 1 in which said cross linking radical is linked to the siloxane backbone of said organopolysiloxane-polyoxyalkylene molecules through a saturated silicon to carbon bond.

10. The composition of claim 1 in which said cross linking radical is an organo siloxane radical.

* * * * *